United States Patent
Lee

[11] 3,891,006
[45] June 24, 1975

[54] ANCHOR AND INSULATION ARRANGEMENT FOR CONDUIT

[76] Inventor: Harvey H. Lee, 1702 Roberts St., Houston, Tex.

[22] Filed: July 5, 1973

[21] Appl. No.: 376,313

[52] U.S. Cl. ............... 138/106; 138/112; 138/149; 138/153; 285/47
[51] Int. Cl. ........................... F16l 3/02; F16l 59/14
[58] Field of Search ........... 138/106, 141, 153, 108, 138/113, 115–117; 285/47; 248/49

[56] References Cited
UNITED STATES PATENTS

| | | | |
|---|---|---|---|
| 2,962,051 | 11/1960 | Burkes, Jr. | 285/47 X |
| 3,369,826 | 2/1968 | Boosey et al. | 285/47 |
| 3,642,308 | 2/1972 | Zeile, Jr. et al. | 285/47 |

Primary Examiner—Richard C. Queisser
Assistant Examiner—Daniel M. Yasich
Attorney, Agent, or Firm—Jack W. Hayden

[57] ABSTRACT

An anchor and insulation arrangement for a conduit or pipe employed in cryogenic conditions includes an outer housing for surrounding the conduit, the housing including longitudinally extending, spaced members secured thereto and extending inwardly thereof and reinforcing members secured to said housing adjacent the ends thereof. A cage arrangement is adapted to be secured to the pipe within the housing and includes end members with members extending longitudinally therebetween which are in spaced relation about the conduit. Rigid, cellular type material such as polyurethane preferably having a density in the range of about 4 to about 30 pounds per cubic foot, is formed in the housing and fills the space between the housing and the conduit, whereupon the housing and cage cooperate to act as an anchor to inhibit any relative movement between the conduit, the housing and cage, as well as providing an insulation arrangement. The rigid cellular type material includes annular projecting segments at each end to aid in inhibiting icing.

9 Claims, 5 Drawing Figures

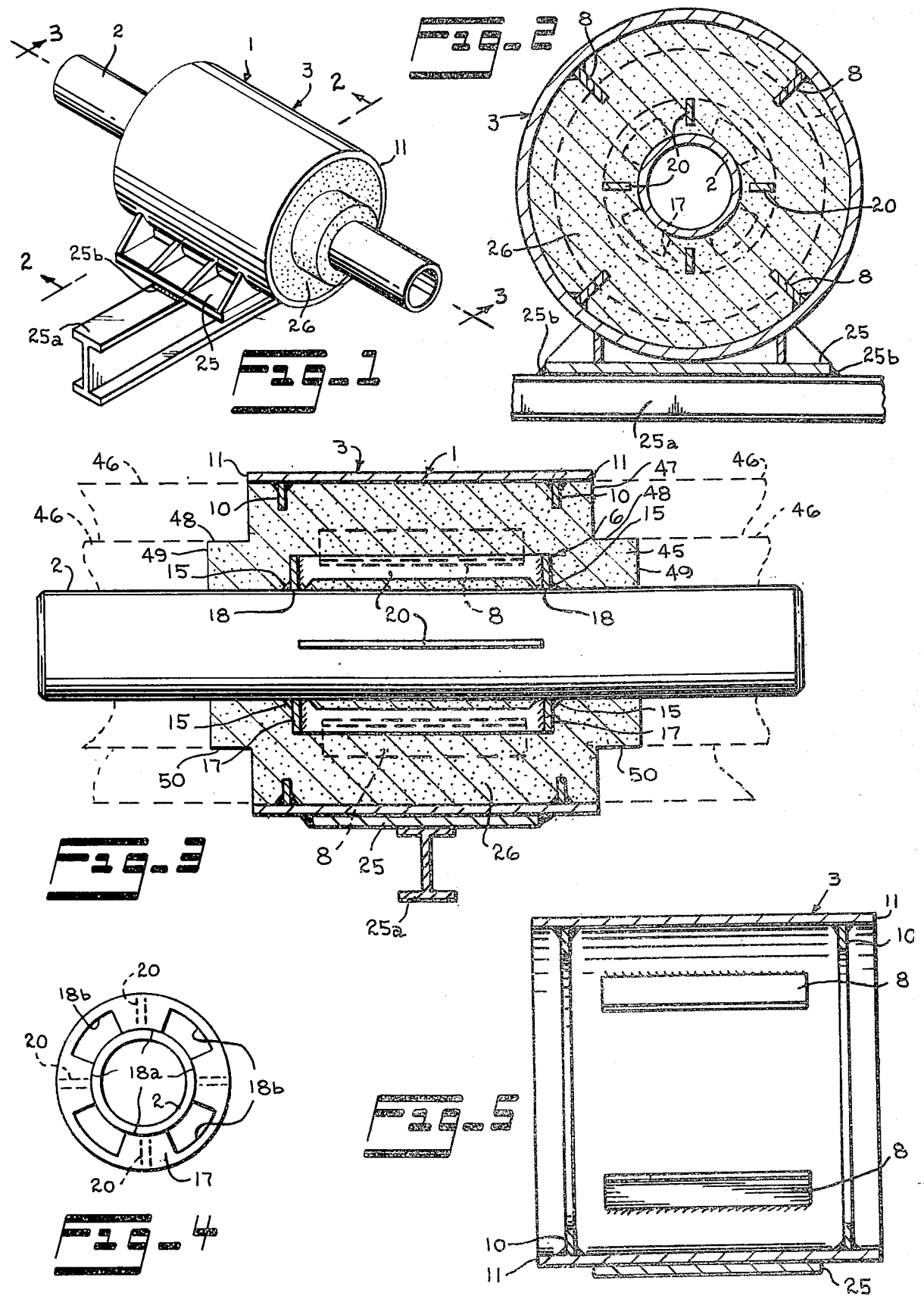

ANCHOR AND INSULATION ARRANGEMENT FOR CONDUIT

CROSS REFERENCE TO RELATED APPLICATION

The present invention relates to another form of insulation arrangement as described and claimed in my copending application for "Pipe Insulation Load Bearing Support" filed on Mar. 9, 1972, bearing Ser. No. 233,042.

DESCRIPTION OF THE PRIOR ART

The prior art with which applicant is familiar includes the following patents: to Lawton, U.S. Pat. No. 2,875,931; Heverly, U.S. Pat. No. 2,891,749; Kemper, U.S. Pat. No. 3,000,433; Seiler, U.S. Pat. No. 3,122,346; Litz, U.S. Pat. No. 3,185,758; Coffman, U.S. Pat. No. 3,244,388; Heulster, U.S. Pat. No. 3,336,951; and Lancaster, U.S. Pat. No. 3,563,503.

While the above patents disclose various forms of insulated pipe supports, it is contemplated that the present invention not only provides an insulation arrangement for a pipe or conduit to be employed in extremely low temperature conditions, but also an arrangement wherein the insulation arrangement acts as an anchor to position the conduit and to inhibit any relative movement between the insulation arrangement and such conduit.

Still another object of the present invention is to provide an insulation and anchor arrangement for a conduit which is constructed and arranged so that the insulation acts not only as an insulation, but also as an anchor to inhibit rotational or longitudinal movement of the pipe or conduit with which is associated, as well as inhibiting skewing of the pipe relative to the anchor and insulation arrangement.

Still another object of the present invention is to provide a housing and cage arrangement adapted to be positioned on a pipe and filled with high density cellular type material such as polyurethane so that such rigid cellular material aids in positioning the housing relative to the pipe and cage thereon and the housing and cage along with the rigid polyurethane not only act as an insulation for the pipe, but also as an anchor to anchor the insulation arrangement on the pipe to inhibit relative movement therebetween. The cellular material is of a peculiar configuration to aid in inhibiting icing between the present invention and the other insulation on the conduit.

Yet a further object of the present invention is to provide an anchor and insulation arrangement including an outer housing for surrounding a pipe, a cage arrangement for fitting on the pipe within the housing, and said housing and cage being constructed and arranged so that when the void therebetween is filled with rigid cellular type material such as high density polyurethane, the pipe is insulated, and is also anchored by such arrangement.

Yet a further object of the present invention is to provide an anchor and insulation arrangement including a housing for surrounding a pipe and a cage arrangement for fitting on the pipe within the housing, the cage arrangement and the housing including structural elements so that when the void between the housing and the cage is filled with rigid cellular type material such as high density polyurethane, such structural elements cooperate with the cellular material to provide a rigid, unitary structure that insulates the pipe and anchors it to inhibit relative movement between the pipe and the insulating structure and anchor arrangement.

Yet a further object is to provide an anchor and insulating structure for a conduit wherein an outer housing surrounds a cage arrangement on a pipe and the housing and cage include a structural arrangment to embed in rigid, cellular type material such as high density polyurethane having a density in the range of about 4 to 30 pounds per cubic foot formed in the housing and surrounding the cage. The structural elements of the housing and cage do not engage so that the polyurethane insulates the pipe, and the resulting structure is rigid to also anchor the pipe while simultaneously insulating it.

Other objects and advantages of the present invention will become more readily apparent from a consideration of the following description and drawings.

BRIEF DESCRIPTION OF THE DRAWINGS

FIG. 1 is a perspective view illustrating a form of the present invention positioned on a conduit or pipe;

FIG. 2 is a sectional view on a line 2—2 of FIG. 1;

FIG. 3 is a sectional view on a line 3—3 of FIG. 1 illustrating structural details of the housing and cage arrangement;

FIG. 4 is an end view of the cage arrangement which fits on the pipe or conduit; and FIG. 5 is a sectional view of the housing to more clearly illustrate the preferred embodiment of the structural details thereof.

DESCRIPTION OF THE PREFERRED EMBODIMENT

Attention is first directed to FIG. 1 of the drawings wherein the invention is referred to generally by the numeral 1 and is shown as being positioned on a pipe or conduit 2. In the preferred form of the invention, the anchor and insulation arrangement of the present invention will be applied to a section of conduit 2 either at the job site or at a shop and carried to the job site; however, it can be appreciated that the components of the present invention could be structurally split and then welded together at the job site and the rigid, cellular type material such as polyurethane having a density in the range of about 4 to 30 pounds per cubic foot poured or formed after the housing referred to generally at 3 has been positioned around the conduit and after the cage arrangement referred to generally by the numeral 6 has been positioned on the pipe or conduit to be insulated and anchored.

The outer housing 3 may be of any suitable configuration and is illustrated as being cylindrical and of a larger size than the conduit 2 which is to be anchored and insulated so that it surrounds such conduit providing a space or void between the outer housing 3 and the conduit 2 for a purpose as will be described.

The outer housing 3 includes members 8 which are secured thereto and extend longitudinally thereof and project inwardly of the housing toward the pipe 2 as illustrated in FIGS. 3 and 5. The longitudinally extending members are spaced relative to each other about the housing 3 and the conduit 2 and terminate at their inner ends in spaced relation to the cage arrangement referred to generally at 6.

Reinforcing members 10 are provided adjacent each end of the housing and are shown in the form of the invention illustrated as being spaced inwardly of the ends 11 of the housing 3 as shown in the drawing. Reinforcing 10 is illustrated as being in the form of continuous annular rings. It will be noted that the rings 10 are spaced from the longitudinally extending members 8 so as not to be in engagement therewith, and also are spaced from the cage arrangement 6.

The cage arrangement 6 is adapted to be secured on the conduit 2 by any suitable means such as by welds 15 and includes the end members 17 which preferably are of suitable configuration to readily fit about the conduit 2 and are provided with openings 18 for positioning on the conduit 2. Members 20 extend between the annular end members or end rings 17 and are secured thereto and are positioned at spaced intervals about the pipe 2 as illustrated more clearly in FIG. 4. In the form of the invention shown the ends of the members engage, or are in close proximity to the periphery of the pipe, while there is a void between the pipe 2 and members 20, between their ends, as shown.

It will be noted from FIG. 4 that the openings 18 in the end rings 17 are of a peculiar configuration and such openings include portions 18a of substantially the same diameter as the conduit 2 so that the rings 17 may be welded thereto as well as arcuate extending segments 18b that are cut out or rings 17 for a purpose as will be described in greater detail herein.

The housing 3 is adapted to receive a footing or support 25, if desired, so that the anchor and insulation arrangement of the present invention may be supported on an I-beam 25a or other suitable support as shown in the drawings. A weld 25b may be employed to secure footing 25 to I-beam 25a.

After the cage arrangement 6 has been positioned on the conduit and the housing 3 positioned therearound, the space or void within the housing and between it and the conduit 2 is filled with polyurethane represented at 26 and preferably having a density in the range of 4 to 30 pounds per cubic foot. Suitable forms may be employed to obtain the exact density desired in a manner well known in the art, and after the polyurethane has set or formed, such forms may be removed.

From the foregoing description it can be appreciated that the rigid, cellular type material such as polyurethane fills the void or space between the outer housing 3 and conduit 2 and is bonded to the outer housing 3 and conduit 2 and has embedded therein the longitudinally extending members 8, reinforcing 10, and the longitudinally extending rods or bars 20 between the end plates 17 of the cage arrangement 6.

In addition, by reason of the configuration of the end plates 17, such end plates are also embedded in the polyurethane since such polyurethane flows through the cutout portions 18b of the end plates 17. Also, the void between the members 20 and pipe 2 is filled with polyurethane. This arrangement provides not only an insulation for the pipe 2, but also provides an anchor for the pipe or conduit 2 and inhibits relative movement of the anchor and insulation arrangement relative to the pipe, or movement of the pipe 2 relative to the anchor and insulation arrangement or relative to the I-beam 25a to which footing 25 is welded, as shown.

In addition, the spacing of the various components of the outer housing 3 relative to the inner cage arrangement not only accomplishes the desired function of anchoring the insulation arrangement of the present invention, but it also provides a relatively rigid structural arrangment where none of the metal components are in contact with each other between the pipe 2 to the outer housing 3. This construction greatly inhibits, if not completely eliminates, heat loss transfer that might otherwise occur in a structural arrangement that functions as an anchor as well as an insulation.

The present invention by reason of its structural arrangement inhibits rotation of the pipe 2 relative to the invention; it inhibits longitudinal movement between the pipe 2 and the invention 1; and it inhibits skewing of the pipe 2 relative to the invention.

The spacing and arrangement of members 10 and 17 is such that they cooperate to act in an opposing manner against each other to inhibit movement due to end thrust in either longitudinal direction of the invention 1.

Similarly, members 8 and 20 cooperate to act in an opposing manner against each other to resist rotational movement of the invention 1 on the pipe 2.

The rigid, cellular type material 26, outer housing 3 and cage arrangement 6 provide a unitary structure that substantially completely insulates pipe 2 as well as anchoring it.

Annular segments 45 are integrally formed with the cellular material body 26 and extend from each end thereof as shown in the drawings. The pipe 2 receives other insulation throughout its extent as shown at 46 in dotted line.

The present invention is provided at longitudinally spaced intervals along the pipe 2 and the insulation 46 extends therebetween. The material flowing through pipe 2 is at extremely low temperatures, such as by way of example only $-200°F$ and below. It can therefore be appreciated that there is a substantial difference in temperature between that in pipe 2 and ambient temperature conditions. Also, some longitudinal movement of pipe 2 due to expansion and contraction will occur and this may tend to try to separate insulation 46 where it is connected or sealed at 47, 48 and 49 to the present invention. Any suitable type of adhesive may be applied at the abutting surfaces 47, 48 and 49 to seal between the present invention and insulation 46.

The annular projecting segments 45 inhibit "icing" of the pipe, in that any separation between the cellular body 26 and insulation 46 at surfaces 47, 48 and 49 provides a path for vapors and if the vapors contact the cold pipe 2, then icing at the surfaces 47, 48 and 49 may occur which in turn would further destroy the seal at 47, 48 and 49 and cause further separation from insulation 46.

If such icing becomes severe enough, then flow through the whole extent of pipe 2 must be shut off and the insulation repaired.

However, the annular segments 45 provide a longer path through which any vapors must flow and the annular surface at 48 is always in engagement with the overlapping insulation 46 at 50 thus inhibiting passage of vapors to pipe 2.

After the present invention has been formed on the pipe section or conduit 2, such section may then be secured in the remainder of the conduit, and the conduit up to the insulation and anchor 1 of the present invention insulated in a manner well known in the art. Where the invention is applied to a conduit without using the pipe section 2, the components are split, as previously mentioned and then secured, as by welding, and the polyurethane 25 formed on the conduit in situ.

The foregoing disclosure and description of the invention are illustrative and explanatory thereof, and various changes in the size, shape, and materials as well as in the details of the illustrated construction may be made without departing from the spirit of the invention.

What is claimed is:

1. An anchor and insulation arrangement for a conduit including:
    a. a cage arrangement for securing to the conduit, said cage arrangement including:
        1. annular end members secured transversely to the conduit; and
        2. members, each including an opening therein, secured between said end members and extending therebetween in circumferentially spaced relation about the conduit;
    b. a short outer housing for surrounding the conduit;
    c. said outer housing including longitudinally extending, circumferentially spaced members secured to and extending inwardly of said housing, said longitudinally extending members being radially spaced from said cage arrangement to form a void therebetween;
    d. means connected to the outer housing for anchoring the housing to a support;
    e. polyurethane surrounding the cage and conduit and filling the void between said cage arrangement and outer housing for insulation of the conduit; and
    f. said housing including inwardly extending reinforcing rings spaced from said longitudinally extending members on said housing, said reinforcing rings on said housing and said cage arrangement end members being positioned relative to each other to act in an opposing manner toward each other to inhibit movement of the conduit anchor and insulation arrangement due to end thrust in either longitudinal direction thereon.

2. The invention of claim 1 including a base secured to said housing for support thereof.

3. The invention of claim 1 wherein said polyurethane includes annular segments projecting at each end.

4. The invention of claim 1 wherein said longitudinally extending members secured to said housing and said members secured between said cage arrangement end members are positioned relative to each other to act in an opposing manner to resist rotational movement of the conduit anchor and insulation arrangement.

5. The invention of claim 1 wherein said end members each include:
    a. a central opening adapted for co-operation with the conduit and;
    b. circumferentially spaced cutout portions disposed about said central opening,
    c. whereby said cutout portions facilitate embedding of said cage arrangement in said polyurethane.

6. The invention of claim 1 wherein said openings in said members secured to said end members and extending therebetween an elongated recesses on their radially innermost sides whereby said elongated recesses facilitate embedding of said cage arrangement in said polyurethane.

7. A device for use in securing a conduit to a support and insulating the conduit from the support and surrounding area, the device comprising:
    a. a cage arrangement adapted to be secured to the conduit, said cage arrangement including as elements thereof;
        1. a pair of annular end members spaced from each other;
        2. elongated members, each having an elongated opening therein, secured to said end members and extending therebetween in circumferentially spaced relation about the conduit;
    b. a short outer housing including:
        1. a hollow cylindrical member surrounding said cage arrangement and defining an interior area;
        2. means connected to said cylindrical member for mounting the device to the support;
        3. elements connected with said cylindrical member and disposed in said interior area, said elements including:
            i. circumferentially spaced, longitudinally extending members extending radially inwardly from said cylindrical member and
            ii. spaced reinforcing rings extending radially inwardly from said cylindrical member;
    c. insulation material in said interior area, said insulation material being interposed between each element of said cage arrangement and each element connected with said cylindrical member so that said cage arrangement and outer housing are completely insulated from one another and so that no path for heat conduction is provided between said cage arrangement and said outer housing;
    d. whereby said elements of said cage arrangement and said elements connected with said outer housing are anchored within said insulation material to strengthen the device and prevent relative movement between the device and the conduit.

8. The invention of claim 7 wherein said insulation material is a rigid, cellular type material.

9. The invention of claim 8 wherein said rigid, cellular type material is polyurethane.

* * * * *